United States Patent [19]
Sreenivas

[11] Patent Number: 6,026,451
[45] Date of Patent: Feb. 15, 2000

[54] SYSTEM FOR CONTROLLING A DISPATCH OF REQUESTED DATA PACKETS BY GENERATING SIZE SIGNALS FOR BUFFER SPACE AVAILABILITY AND PREVENTING A DISPATCH PRIOR TO A DATA REQUEST GRANTED SIGNAL ASSERTED

[75] Inventor: Aditya Sreenivas, El Dorado Hills, Calif.

[73] Assignee: Intel Corporation, Santa Clara, Calif.

[21] Appl. No.: 08/996,303

[22] Filed: Dec. 22, 1997

[51] Int. Cl.[7] .................................................. G06F 13/14
[52] U.S. Cl. ............................... 710/39; 710/29; 710/33; 710/57
[58] Field of Search ................... 710/39, 36, 57, 710/52, 29, 32, 33

[56] References Cited

U.S. PATENT DOCUMENTS

| | | | |
|---|---|---|---|
| 5,146,564 | 9/1992 | Evans et al. | 710/57 |
| 5,239,651 | 8/1993 | Sodos | 710/241 |
| 5,604,866 | 2/1997 | Kolb et al. | 709/235 |
| 5,615,355 | 3/1997 | Wagner | 711/167 |
| 5,706,482 | 1/1998 | Matsushima et al. | 345/521 |
| 5,729,529 | 3/1998 | Martinsson | 370/235 |
| 5,826,041 | 10/1998 | Ogus | 709/301 |

*Primary Examiner*—Thomas C. Lee
*Assistant Examiner*—Ilwoo Park
*Attorney, Agent, or Firm*—Blakely, Sokoloff, Taylor & Zafman LLP

[57] ABSTRACT

In one aspect of the present invention, a method is provided for controlling dispatches of requested data packets. The method includes sending information on each of the requested data packets to a request buffer, generating at least one size signal from the information sent on each of the requested data packets, and generating an available space signal. The size signal corresponds to a size of one of the requested data packets that may be received next. The available space signal corresponds to space available in a data buffer. The data buffer receives the requested data packets. The method also includes comparing the size signal to the available space signal and asserting a data buffer full signal in response to the size signal being greater than the available space signal.

24 Claims, 9 Drawing Sheets

SYSTEM FOR CONTROLLING A DISPATCH OF REQUESTED DATA PACKETS BY GENERATING SIZE SIGNALS FOR BUFFER SPACE AVAILABILITY AND PREVENTING A DISPATCH PRIOR TO A DATA REQUEST GRANTED SIGNAL ASSERTED

BACKGROUND OF THE INVENTION

1. Field of the Invention

The present invention relates generally to computers and memory devices, and more particularly, to an apparatus and method for controlling data dispatch when multiple data requests are concurrently outstanding.

2. Description of the Related Art

Higher performance computers utilize hardware more efficiently to obtain greater throughput. In many cases, the processor speed is limited by the speed of transactions between the processor or another data requester and a memory device. Performance limitations involving the speed of data read or write transactions are commonly referred to as input/output (I/O) bottlenecks. An I/O bottleneck may slow the performance of a data requester when the requester must wait for the data requested before continuing to perform a task.

One method for mitigating the effects of I/O bottlenecks is to give higher priority to memory reads from data requesters with more critical or immediate needs. For example, memory read requests issued by a cache memory may be given a high priority, because the processor remains inactive until the data is returned to the cache memory. On the other hand, memory read requests from a graphics controller may be given a low priority, because the graphics controller can often request data in advance and can wait for the data during several cycles without becoming inactive. Prioritizing the processing of memory reads reduces the impact of I/O bottlenecks.

A priority arrangement for data requests increases the variability in the dispatch time for data requested by low priority requesters, because the processing of higher priority data requests introduces random delays into the processing time for lower priority requests. The uncertainty in the dispatch times creates problems when the low priority data requester issues several data requests concurrently. Then, the low priority requester will occasionally receive the data from two requests nearly simultaneously and may not be able finish processing the data from the first request quickly enough to setup and accept the data from the second request. The data for the second request may simply be lost when two requests are occasionally fulfilled substantially contemporaneously.

In the prior art, there are at least two approaches for addressing this problem. In the first approach, the low priority data requester does not issue a new data request until the data for all earlier requests has been received. When only one data request is outstanding, the dispatched data can be accepted and there is little risk that the requester will not be setup to receive the dispatched data. Unfortunately, waiting for each data read to be received before issuing a subsequent requests is inefficient. Such a method can slow the performance even of low priority requesters. In the second approach, the data retrieved for read requests is stored in one or more data buffers until the requesters are able to accept the data. Unfortunately, such data buffers may have to be large to accommodate occasional backlogs of dispatched data. The second approach may require substantial hardware that occupies a prohibitive area on a chip's die. In the prior art, prioritizing read requests often entails either slowing the lower priority data requesters or using substantial hardware for the data buffers that temporarily store the dispatched data.

The present invention is directed to overcoming, or at least to reducing the effects of, one or more of the problems set forth above.

SUMMARY OF THE INVENTION

In one aspect of the present invention, a method is provided for controlling dispatches of requested data packets. The method includes sending information on each of the requested data packets to a request buffer, generating at least one size signal from the information sent on each of the requested data packets, and generating an available is space signal. The size signal corresponds to a size of one of the requested data packets that may be received next. The available space signal corresponds to space available in a data buffer. The data buffer receives the requested data packets. The method also includes comparing the size signal to the available space signal and asserting a data buffer full signal in response to the size signal being greater than the available space signal.

BRIEF DESCRIPTION OF THE DRAWINGS

Other objects and advantages of the invention will become apparent upon reading the following detailed description in conjunction with the drawings in which.

Figure 1:
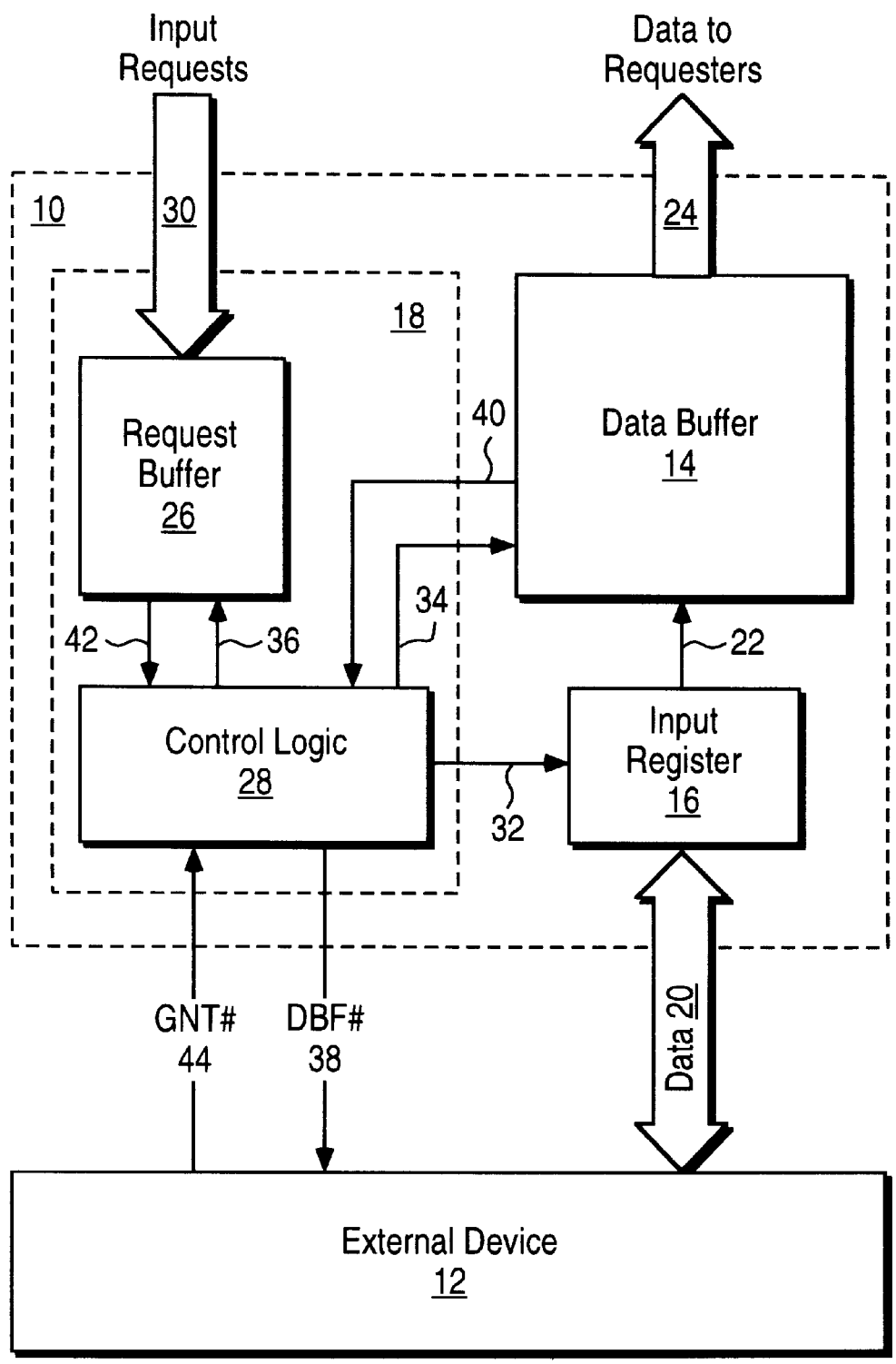
FIG. 1 is a high-level diagram illustrating a system for controlling the receipt of data packets.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The illustrative embodiments control the return of data that has been requested from an external device, e.g., an external memory device. The data requests are made without either waiting to receive data from earlier requests or reserving space to temporarily store the data when dispatched. Several data requests to the external device may be concurrently outstanding.

In the below-described embodiments, the external device dispatches the data in packets having variable but known sizes. For example, the packet sizes may be integer multiples of the bandwidth of the bus structure transmitting the data. Furthermore, the external device transmits the packets for earlier requests first. The exact cycle that a requested data packet will be dispatched is however, uncertain. In some embodiments, the data requests are low priority operations and higher priority operations of the external device cause the uncertainty in the dispatch times. For example, the data requests may be low priority read requests to an accelerated graphics port, to an industry standard architecture (USA) bus, peripheral component interconnect (PCI), a second processor, or similar structures that dispatch requested data in packets of various sizes on buses. The embodiments control the return of individual data packets from the external device to insure that a data buffer has space available for temporarily storing each packet dispatched.

FIG. 1 is a high-level diagram illustrating a system 10 for controlling the flow, that is the return, of data that has been requested from an external device 12, e.g., a memory storage device. The system 10 includes a data buffer 14, an input register 16, and a data flow controller 18. A bus 20 transmits the data from the external device 12 to the input register 16. A line 22 connects output terminals of the input register 16 to data input terminals of the data buffer 14. The data buffer 14 is a temporary storage device that forwards the dispatched data to output lines 24 when the original requesters (not shown) are ready to accept the data. The data flow controller 18 includes a request buffer 26 and a control logic unit 28. The request buffer 26 stores information on outstanding data requests. The request buffer 26 receives the data requests from input lines 30. The control logic unit 28 controls both the return of the data packets from the external device 12 and the handling of the data packets by the system 10.

The control logic unit 28 uses control lines 32, 34, 36, 38 for controlling the handling of data by the input register 16 and the data buffer 14, the handling of data requests by the request buffer 26, and the transmission of new data packets by the external device 12. Input lines 40 signal the control logic unit 28 on available space in the data buffer 14. Input lines 42 bring signals to the control logic unit 28 on outstanding data requests in the request buffer 26. An input line 44 warns the control logic unit 28 that a requested data packet has been granted by the external device 12. The signals from the data buffer 14, the request buffer 26, and the external device 12 enable the control logic unit 28 to direct the handling of data and to control the dispatch of new data.

The control logic unit 28 stalls the dispatch of new data packets by sending a data buffer full (DBF#) signal to the control line 38 of the external device 12. The external device 12 sends a granted (GNT#) signal to the input line 44 of the control logic unit 28 a fixed time prior to each dispatch of a new data packet. The DBF# signal stalls the transmission or dispatch of a data packet if the external device 12 receives the DBF# signal before sending the associated GNT# signal. The control logic unit 28 has a setup time for processing input signals from the data buffer 14, the request buffer 26 and the line 44 to determine whether the DBF# signal should be asserted. Because of the setup time, the control logic unit 28 cannot ordinarily stall the dispatch of a new data packet immediately after receiving input signals that indicate a potential overflow. The control logic unit 28 ordinarily needs one to several clock cycles to determine whether a data buffer 14 overflow is possible from the input signals.

In the illustrative embodiments of FIGS. 2–9, the setup time of the control logic unit 28 is two transmission cycles for the external device 12. Thus, the control logic unit 28 may not be able to stall the dispatch of the next two data packets to be granted. The control logic unit 28 sends a DBF# signal if the next two data packets, for which a GNT# has not been received, could cause an overflow in the data buffer 14. In the illustrative embodiments, the data buffer full and the granted signals are asserted through signals having the value logic 0.

The illustrative embodiments trigger sequential logic components of the system 10 on both rising and falling edges of triggering signals to obtain a two cycle setup time. In other embodiments, the setup time of the control logic unit 28 and length of time between transmission cycles may be different. Then, the control logic unit 28 may be constructed on an assumption that a different number of outstanding data requests could be granted before the DBF# is asserted to the external device 12. In other embodiments, the control logic unit 28 accounts for a fixed number of dispatch cycles between the receipt of the signals indicating not enough space in the data buffer 14 and the time that a stall of the external device 12 becomes effective.

Figure 2:
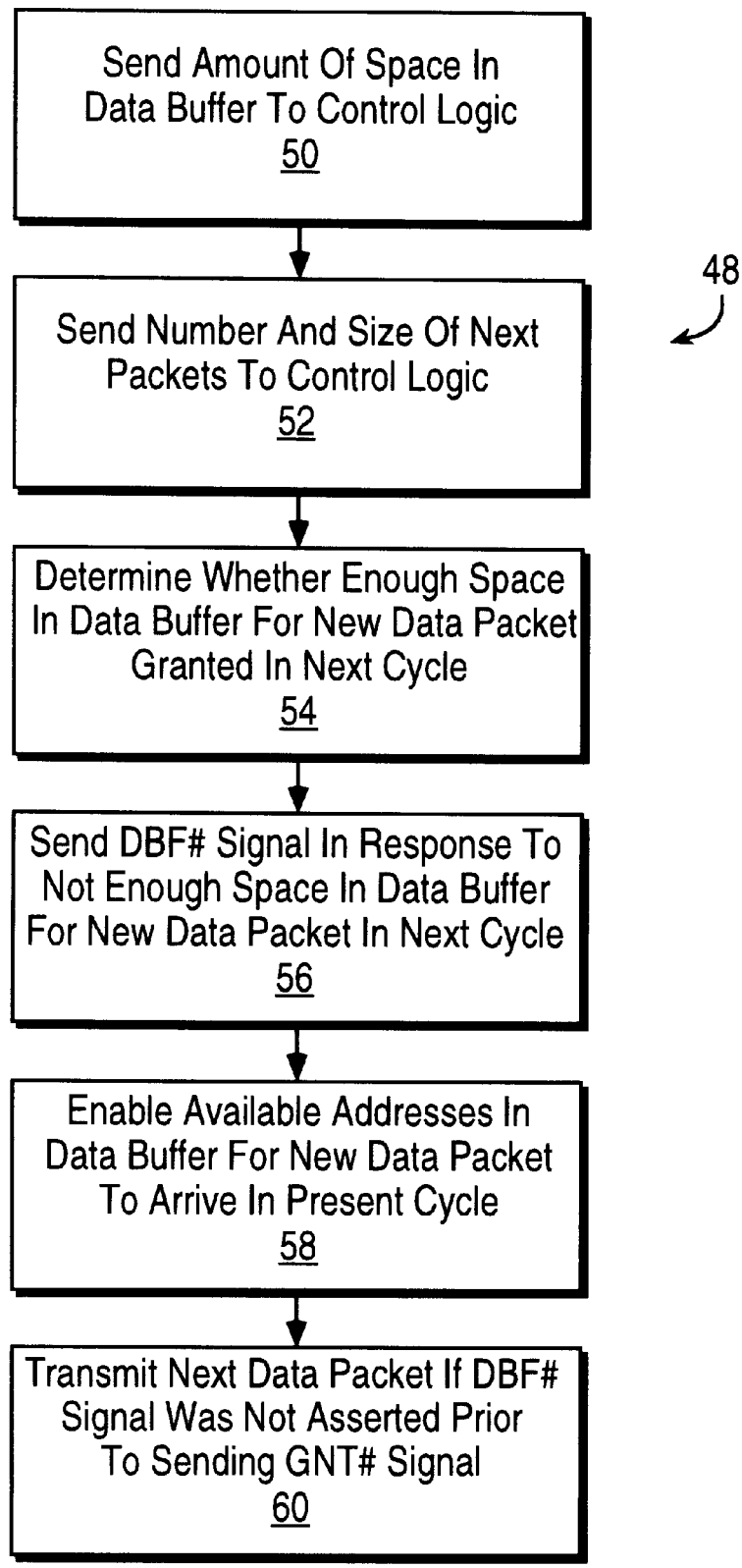
FIG. 2 is a flowchart illustrating a method for controlling the receipt of data packets.

FIG. 2 is a flowchart illustrating a method 48 for controlling the dispatch of data packets with the system 10 of FIG. 1. At block 50, the data buffer 14 sends signals to the control logic unit 28, indicating the amount of available space therein. At block 52, the request buffer 26 transmits signals for numbers and sizes of outstanding data requests to the control logic unit 28. At block 54, the control logic unit 28 determines whether the data buffer 14 has enough space to store new data packets that could potentially be granted, i.e., by a GNT# signal, during the two cycles following receipt of the signals from the data and request buffers 14, 26. The determination depends on whether a GNT# signal has been received. In some embodiments, a new determination is performed during each clock cycle. At block 56, the control logic unit 28 sends a DBF# signal to the external device 12 if newly granted data packets could cause an overflow in the data buffer 14. At block 58, the control logic unit 28 enables the data buffer 14 to receive a data packet if there is space available. At block 60, the external device 12 transmits a new data packet if a DBF# signal is not received prior to sending the GNT# signal for the packet. If the external device 12 receives the DBF# signal prior to sending the GNT# signal, the external device 12 does not transmit new granted signals or transmit data packets not yet granted as long as the DBF# signal is asserted.

Figure 3:
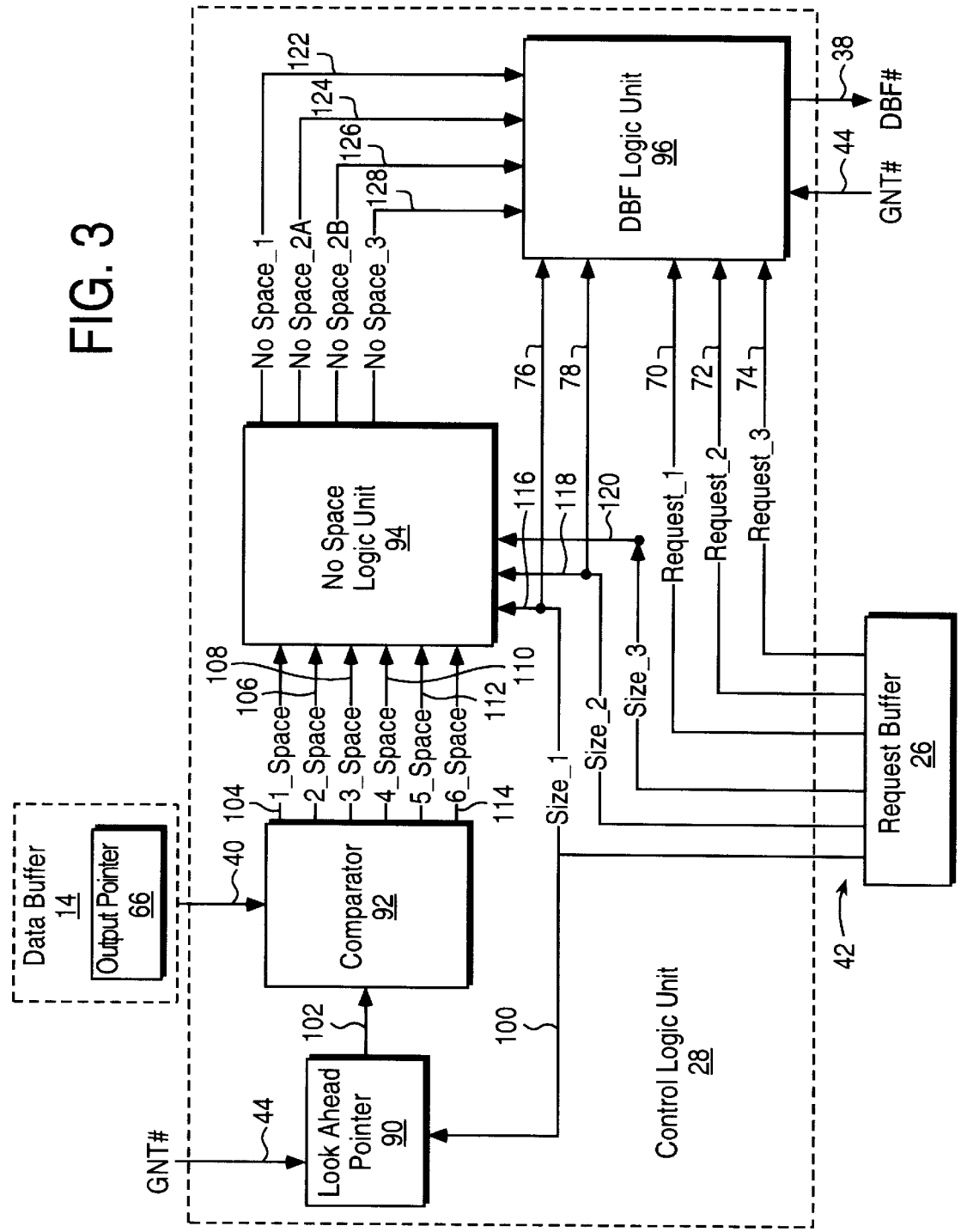
FIG. 3 is block diagram of one embodiment of the control logic unit of FIG. 1.

FIG. 3 illustrates the control logic unit 28 for producing the DBF# signals. The control logic unit 28 receives groups of input signals from the data buffer 14, the request buffer 26 and the external device 12 on the input lines 40, 42, 44. The lines 40 carry digital signals indicating the position of an output pointer 66 of the data buffer 14. For the data buffer 14 illustrated in FIG. 4, the input and output pointers 68, 66 of the data buffer 14 take eight positions described by the three binary-digit numbers 000, 001, . . . , 111. The lines 42 form two groups. The first group of lines 70, 72, 74 carries one-bit logical signals related to the number of outstanding requests in the request buffer 26. The second group of lines 76, 78 carries digital signals on the size of outstanding data requests. In the below-illustrated embodiments, the requested packets have sizes equal to one, two, three, or four quadwords of data. Table 1 summarizes the signals appearing on the lines 70, 72, 74, 76, 78 from the request buffer 26.

TABLE 1

Output Signals from the Request Buffer

| LOGIC SIGNAL | FOR LOGIC SIGNAL TO HAVE THE VALUE LOGIC 1 |
|---|---|
| REQUEST_1: | At least one request is outstanding in the request buffer. |
| REQUEST_2: | At least two requests are outstanding in the request buffer. |
| REQUEST_3: | At least three requests are outstanding in the request buffer. |

| DIGITAL SIGNAL | DEFINITION OF SIGNAL |
|---|---|
| SIZE-1: | Two bit signal for size of data packet for the oldest outstanding request. The signals 00, 01, 10, and 11 correspond to one, two, three, and four quadwords, respectively. |
| SIZE-2: | Size of data packet for second oldest outstanding request. The signals 00, 01, 10, and 11 correspond to one, two, three, and four quadwords, respectively. |
| SIZE-3: | Size of data packet for the third oldest outstanding request. The signals 00, 01, 10, and 11 correspond to one, two, three, and four quadwords, respectively. |

The control logic unit 28 has four logical devices 90, 92, 94, 96 that process signals from the input lines 40, 42, 44 to determine whether to assert the DBF# signal. The combined setup delay from the stages of logic devices 90, 92, 94, 96 determines how many future transmission cycles must be analyzed to determine whether to assert the DBF# signal. In the below-described embodiments, both rising and falling edges of timing signals perform triggering of logic components so that the total setup time is only two transmission cycles. The invention is intended to include other embodiments that could be constructed by a person of ordinary skill in the art having the knowledge of this disclosure even though the setup times may be different.

Referring to FIG. 3, the first logic device 90 is a look ahead pointer. The look ahead pointer 90 is initially reset to point to the same address as the initial address of the input pointer 68 (see FIG. 4) of the data buffer 14. From an output line 100 of the request buffer 26, the look ahead pointer receives data on the size of the next data packet to be returned. From the input line 44, the look ahead pointer 90 receives the GNT# signal that tells whether the external device 12 has granted the next data packet to be returned. An output line 102 of the look ahead pointer 90 sends a digital signal to a comparator 92 for the updated position of the input pointer 68 of the data buffer 14 after receipt of any already "granted" data packets. The signal, on line 102, is the position of the input pointer 68 after the data packet is received, but the look ahead pointer 90 updates the signal on the line 102 earlier at the time that a GNT# is received.

Referring to FIG. 3, the second logic device 92 is the comparator that determines the available space in the data buffer 14. The comparator 92 receives signals on the lines 102, 40 for positions of the look ahead input pointer 90 and the output pointer 66, respectively. The available space in the data buffer 14 is the difference in the positions of the input pointer 68 and the output pointer 66. But the comparator uses the difference in the positions of the look ahead pointer 90 and the output pointer 66. Therefore, the signals for the available space from the comparator 92 do not include space that will be used to store data packets for which a GNT# signal has already been received. In the below-described embodiments, the comparator 92 sends six output signals to the third logic device 94 via dedicated lines 104, 106, 108, 110, 112, 114. The lines 104, 106, 108, 110, 112, 114 carry a signal of logic 1 when at least one, two, three, etc. one-quadword spaces are available in the data buffer 14 for temporarily storing newly returned data. In other embodiments, the comparator 92 produces different numbers and types of output signals for characterizing the available space in the data buffer 14. Table 2 summarizes the six output logic signals of the comparator 92.

TABLE 2

Output Signals from the Comparator

| LOGIC SIGNAL | FOR SIGNAL TO HAVE THE VALUE LOGIC 1 |
|---|---|
| 1_SPACE | At least one quadword can be stored in the data buffer. |
| 2_SPACE | At least two quadwords can be stored in the data buffer. |
| 3_SPACE | At least three quadwords can be stored in the data buffer. |
| 4_SPACE | At least four quadwords can be stored in the data buffer. |
| 5_SPACE | At least five quadwords can be stored in the data buffer. |
| 6_SPACE | At least six quadwords can be stored in the data buffer. |

Referring to FIG. 3, the third logic device 94 is a no space logic unit. The no space logic unit 94 receives input signals on the available space in the data buffer 14 on the lines 104, 106, 108, 110, 112 from the comparator 92 and input signals on the size of the packets for outstanding data requests from the output lines 116, 118, 120 from the request buffer 26. The no space logic unit 94 produces four signals having the values of logic 1 or logic 0 on four output lines 122, 124, 126, 128. The signals on the four output lines 122, 124, 126, 128 indicate whether there is enough space in the data buffer 14 for various combinations of packets for outstanding data requests. For the below-described embodiments, the output signals of the no space logic unit 94 are summarized in Table 3. In other embodiments, the logic conditions for the output signals from the no space logic unit 94 may be different.

TABLE 3

No Space Logic Signals

| LOGIC SIGNAL | FOR SIGNAL TO HAVE THE VALUE OF LOGIC 1 |
|---|---|
| NO_SPACE_1 | No space for the next data packet in the data buffer. |
| NO_SPACE_2A | No space for the next two data packets in the data buffer OR no space for the after next data packet plus 1 quadword. |
| NO_SPACE_2B | No space for the next two data packets in the data buffer OR no space for the after next data packet plus two quadwords. |
| NO_SPACE_3 | No space for the next three data packets in the data buffer OR no space for the third data packet plus two quadwords. |

The DBF logic unit 96 produces the DBF# signal on the control line 38 to stall the transmission of data packets by the external device 12. The DBF logic unit 96 receives input logic signals on the lines 122, 124, 126, 128 from the no space logic unit 94. The DBF logic unit 96 also receives input signals for the size and for the number of packets for outstanding data requests on the output lines 76, 78 and the output lines 70, 72, 74 from the request buffer 26. The form of the input logic and digital signals of the DBF logic unit 96 vary in different embodiments.

Figure 4:
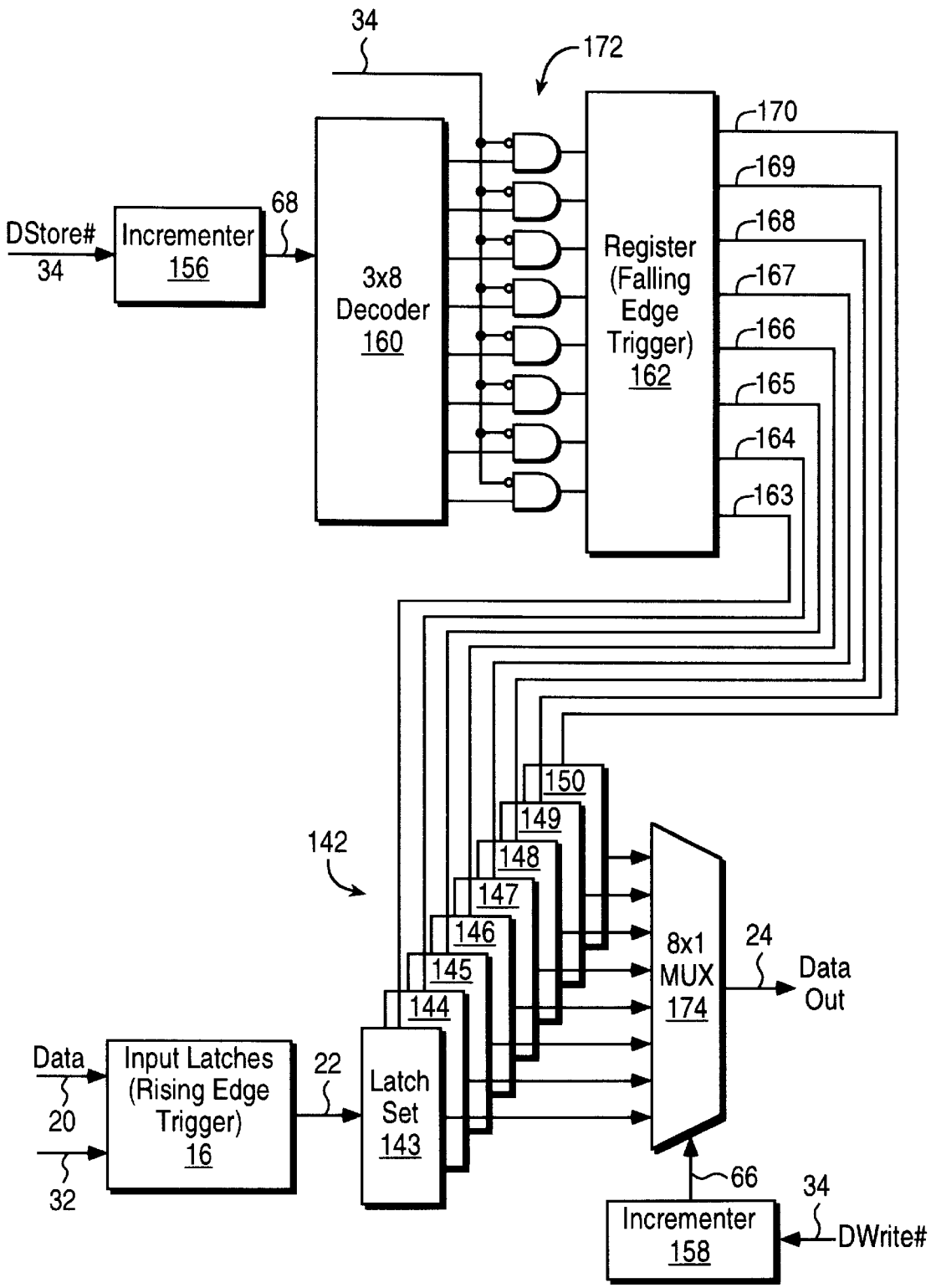
FIG. 4 is a circuit diagram for one embodiment of the data buffer of the embodiment of FIG. 1.

FIG. 4 illustrates one embodiment for the data buffer 14 which has eight addresses for storing one quadword each in a circular first-in-first out (FIFO) arrangement. The data buffer 14 includes a bank 142 of eight latch sets 143–150 that store one quadword each. The signals on the input and output pointers 68, 66 point to the addresses of individual latch sets 143–150 in the bank 142. The addresses are three binary-digit integers mod 8, i.e.. the addresses are 000, 001, . . . , 111. The address signal on the input pointer 68 is updated to the address of the next latch set 143–150 to store data just prior to enabling the bank 142 to receive one quadword of new data from the input line 22. The address signal on the output pointer 66 is updated, to the address of the next latch set 143–150 to write data to a ready requester (not shown), just prior to enabling the output lines 24 to write data. Each time an appropriate signal is received on one of the lines 34, the attached incrementer 156, 158 advances the address signal on the attached pointer 68, 66 by one binary digit.

The control logic unit 28 of FIG. 1 sends a Dstore# or Dwrite# control signal to the line 34 connected the appropriate incrementer 156, 158 each time another quadword of data is to be stored to or written from the data buffer 14. In response to Dstore# or Dwrite# signals the corresponding incrementer 156, 158 adds 001 to the address signal on the input or output pointer 68, 66 as appropriate. The corresponding incrementer 156, 158 changes the initial mod 8 address 011 to 100, but the initial mod 8 address 111 is changed to 000 in response to the appropriate Dstore# or Dwrite# signal.

The three bit binary signal from the input pointer 68 controls a 3×8 decoder 160. The Dstore# signal enables a bank of gates 172 to send an address signal from the decoder 160 to a register 162. The Dstore# signal is only sent when the data buffer 14 has at least one available latch set 143–150 to store new data. The register 162 sends the address signal to one of the lines 163–170 that enables an individual latch set 143–150. The Dstore# signal on the line 34 monotonically advances the address of the latch set 143–150 for storing new data received from the input latches 16.

When the data requester is ready to use the returned data that it requested, the control logic unit 28 pulses a Dwrite# signal 34. Each time that a Dwrite# signal is received on the line 34, the incrementer 158 advances the three bit address signal on output pointer 66 in a similar manner as the incrementer 156 advances the address signal on the input pointer 68. The incrementer 158 adds 001 to the present address signal on the output pointer 66. The signal on the output pointer 66 operates the select terminals on an 8×1 multiplexer 174 to enable an individual latch set 143–150 to write the next quadword of stored data to the output lines 24. Thus, a Dwrite# signal on the line 34 affects writing data to the output lines 24 in a manner that is similar to the manner that a Dstore# signal affects storing data from the line 22. The combined operation of Dstore# and Dwrite# signals is that the data buffer 14 operates as an eight-address, circular, FIFO buffer that can store one quadword of data at each address. In other embodiments, the data buffer 14 has different sizes and stores data in words of different sizes.

The data buffer 14 stores received new data rapidly. Each quadword of data from the data bus 20 is stored in input latches 16 on the rising edge of a clock signal. Subsequently, on the falling edge of the same clock signal one of the latch sets 143–150 is enabled by the enable signal from the register 162 and stores a quadword of new data. For each quadword of new data to be stored, a separate Dstore# signal is transmitted to enable the next sequential latch set 143–150. The data buffer 14 of FIG. 4 can store one quadword of data in each clock cycle.

Figure 5:
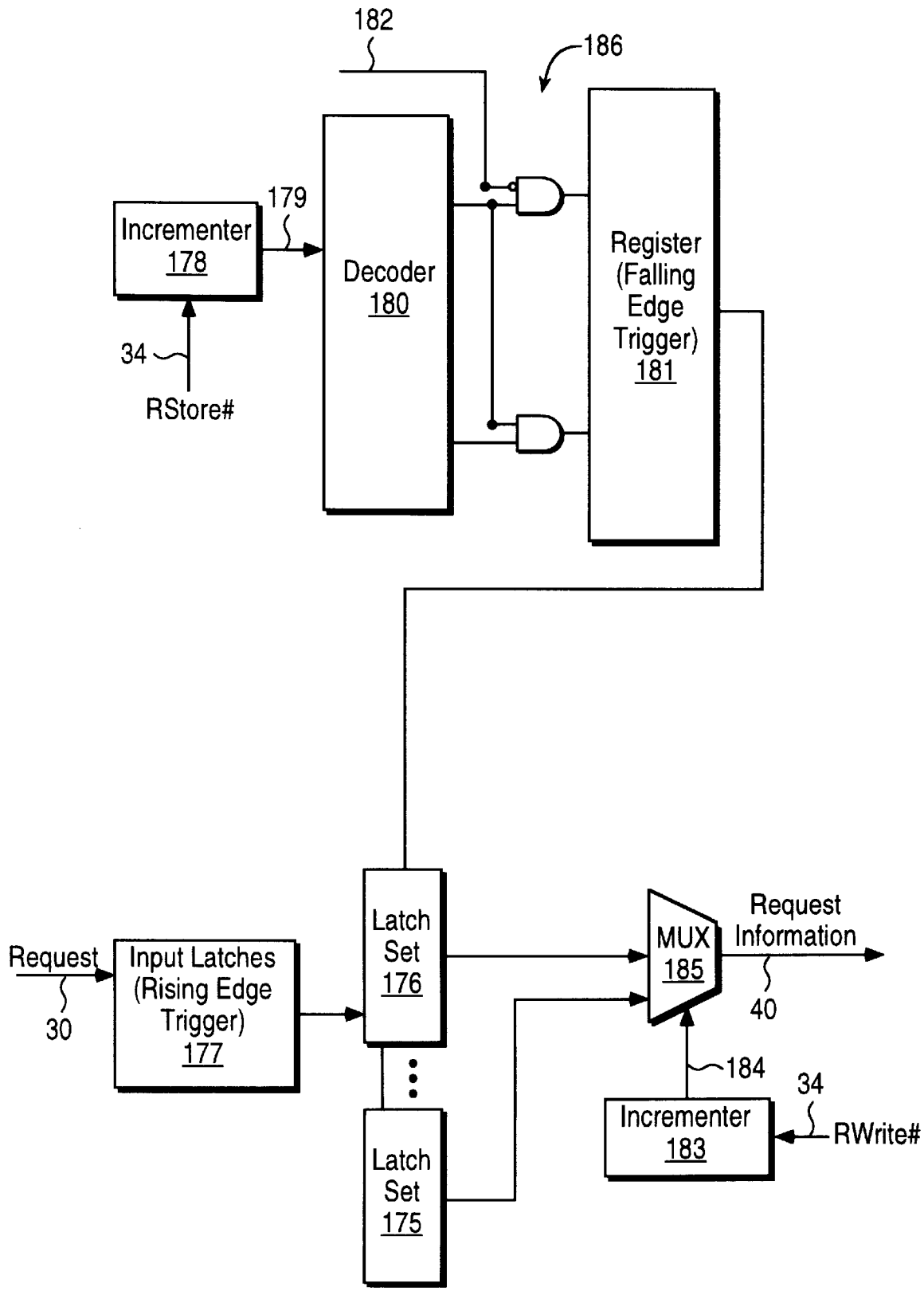
FIG. 5 is a circuit diagram for one embodiment of the request buffer of the embodiment of FIG. 1.

FIG. 5 illustrates an embodiment for the request buffer 26 of FIG. 1. Outstanding data requests are stored in individual latch sets, e.g., the latch sets 175, 176. In one embodiment, each latch set 175, 176 stores the data request, the size of the data requested, i.e. the number of quadwords, the identity of the data requester, and a valid bit indicating whether the request is still outstanding. When a new request is received, an Rstore# signal pulses an incrementer 178 and enables the input register 177 to initially latch the request. The incrementer 178 advances the address signal on an input pointer 179 by one in a manner similar to the manner that the incrementer 156 advances the address signal on the input pointer 68 of the data buffer 14 in response to a Dstore# pulse. A decoder 180 changes the write address on the input pointer 179 to an address logic signal and sends the logic signal to a register 181 on the rising edge of the same clock pulse that stores the new request in the input register 177. On the falling edge of the same clock pulse, the register 181 sends the address enable signal to the enable terminal of the latch set 175, 176 corresponding to the write address. A bank 186 of gates send the address enable signal from the decoder 180 to a register 181 when the request buffer 26 is not full. The register 181 sends the enable signal to the address of the individual latch set 175, 176 that will store the next request on the falling edge of the same clock pulse that latched the request to the register 177.

An incrementer 183 advances the address of the output pointer 184 by one in response to receiving each Rwrite# signal on line 34 from the control logic unit 28. The signal on the output pointer 184 selects inputs of a multiplexer 185 to send information from the latch sets 175, 176 to the control logic unit 28 via the lines 40. The request buffer 26 act as a circular FIFO buffer similar to the data buffer 14 of FIG. 4.

The embodiments of the data and request buffers 14, 26 may have some differences. First, the size of the request buffer 26 may be different than the size of the data buffer 14. The size of the request buffer 26 is determined by the number of data requests that may be outstanding at any one time. The size of the data buffer 14 is determined by the number of data requests that may be dispatched and waiting for ready requesters at any one time. Second, the request buffer 26 sends information on the size and number of outstanding data requests to the control logic unit 28. Third, the request buffer 26 may send information on several outstanding requests to the data buffer 14 each time a Rwrite# signal is received. For example, the request buffer 26 shown in FIG. 3 sends information on the three oldest outstanding requests to the control logic unit 28 each time a Rwrite# signal is received. Such a request buffer has some additional hardware not shown in FIG. 5. The additional hardware involves replacing the multiplexer 185 with three multiplexers and connecting the output pointer 184 to select input terminals of the three multiplexers so that three consecutive latch sets 175, 176 write to the output lines 40 each time a Rwrite# signal is received. For example, one latch set writes to the pair of lines 70, 76 of FIG. 3 each time at least one request is outstanding, a second latch set 175, 176 writes to the pair of lines 72, 78 each time at least two requests are outstanding, etc. The present invention is intended to cover all modifications of the request buffer that a person of ordinary skill in the art would be able to construct without undue experimentation in light of the present disclosure.

Figure 6:
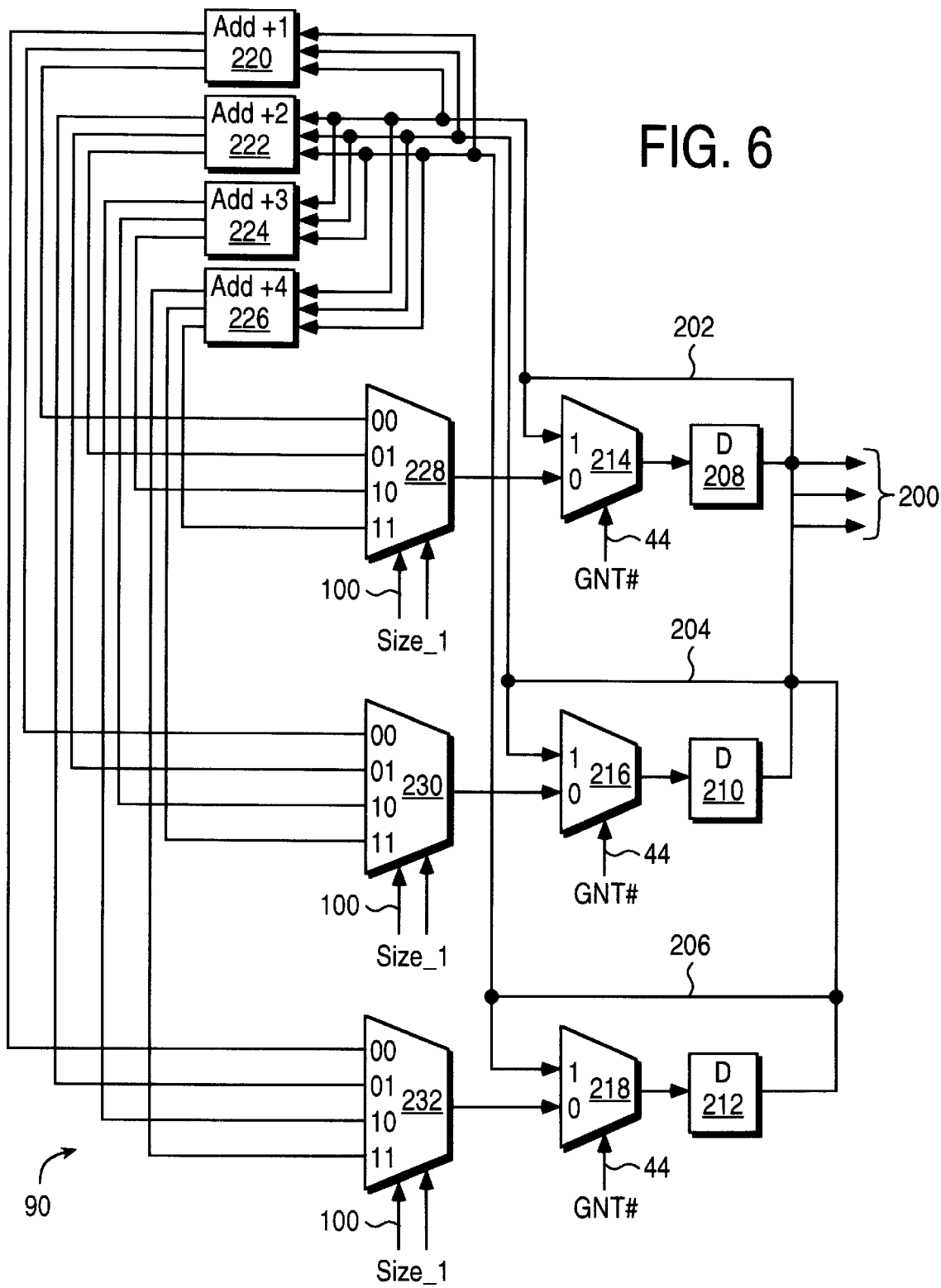
FIG. 6 is a circuit diagram for one embodiment of the look ahead pointer of FIG. 3.

FIG. 6 illustrates one embodiment of the look ahead pointer 90 for a data buffer 14 having eight addresses, i.e. the data buffer 14 of FIG. 4 having eight addresses that store one quadword each. The output lines 200 provide a three binary digit signal representing the address signal of the input pointer 68 at a later time when any presently granted data packets are stored in the data buffer 14. The look ahead pointer contains one feedback loop 202, 204, 206 for each binary digit of the address signal. Each feedback loop 202, 204, 206 connects the output terminal of a D flip flop 208, 210, 212 to one input terminal of a 2×1 multiplexer 214, 216, 218. If the GNT# signal is not asserted on the input terminals 44 of the control logic unit 28, the feedback loops 202, 204, 206 recycle the previous address signals appearing on the output lines 200 in each clock cycle. If the GNT# signal is asserted, the adders 220, 222, 224, 226 add to the old output signal the size of the data packet granted during the present cycle in quadwords. The data packets of the embodiment illustrated can have sizes of one, two, three or four quadwords. Three 4×1 multiplexers 228, 230, 232 are employed to choose the adder 220, 222, 224, 226 that corresponds to the size of the granted data packet. The multiplexers 228, 230, 232 are controlled by the digital signals from the output line 100 of the request buffer 26. A binary signal of the form 00, 01, 10, 11 on the output line 100 corresponds to the granted data packet having a size of 1, 2, 3, or 4 quadwords. Thus, the look ahead pointer 90 uses size information from the request buffer 26 and the GNT# signal from the memory device 12 to determine the input pointer 68 of the data buffer 14 after any already granted data packets are subsequently stored in the data buffer 14.

Figure 7:
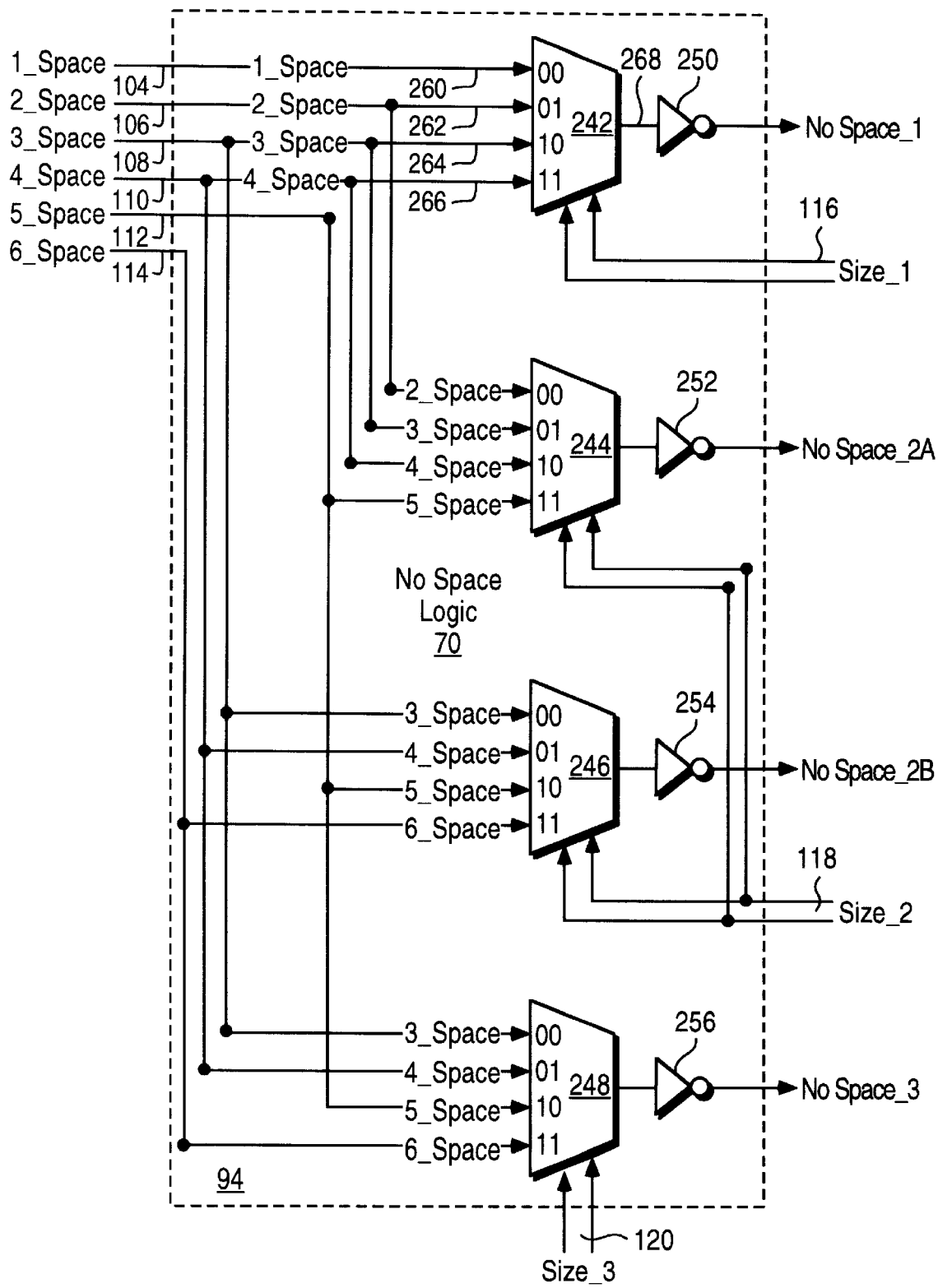
FIG. 7 is a circuit diagram for one embodiment of the no space logic unit employed in FIG. 3.

FIG. 7 illustrates an embodiment for the no space logic unit 94 of FIG. 3. The no space logic unit 94 sends logic signals 1_SPACE, 2_SPACE, . . . , 6_SPACE, defined in Table 2, from the output lines 104, 106, 108, 110, 112, 114 of the comparator 92 of FIG. 3 to input terminals of four 4×1 multiplexers 242, 244, 246, 248. The SIZE_1, SIZE_2, and SIZE_3 signals, defined in Table 1, from the output lines 116, 118, 120 of the request buffer 26, control select terminals of the four multiplexers 242, 244, 246, 248. The output of each multiplexer 242, 244, 246, 248 passes through a corresponding inverter 250, 252, 254, 256. The output lines 122, 124, 126, 128 from the inverters 250, 252, 254, 256 produce the logic signals NO_SPACE_1, NO_SPACE_2A, NO_SPACE_2B, and NO_SPACE_3 defined in Table 3.

To illustrate the operation of the no space logic unit 94, consider the first multiplexer 242. The input terminals 260, 262, 264, 266, of the multiplexer 242 receive the signals 1_SPACE, 2_SPACE, 3_SPACE, 4_SPACE, wherein N_SPACE has the value logic 1 if the data buffer 14 has space for at least N quadwords ungranted data. The SIZE_1 signal, on the line 116, selects the input terminal 260, 262, 264, 266 that receives the logic signal M_SPACE where M is the size of the oldest outstanding data request in the request buffer 26. On line 268, the signal has the value logic 1 when there will be space to store the data for the oldest outstanding request in the data buffer 14, and the signal has the value logic 0 when there may not be space to store the data for the oldest request. Thus, the output signal from the inverter 250 corresponds to the logic signal NO_SPACE_1. By similar reasoning, a person of ordinary skill in the art will realize that the output signals on the lines 124, 126, 128 correspond to the signals NO_SPACE_2A, NO_SPACE_2B, and NO_SPACE_3, respectively.

Figure 8:
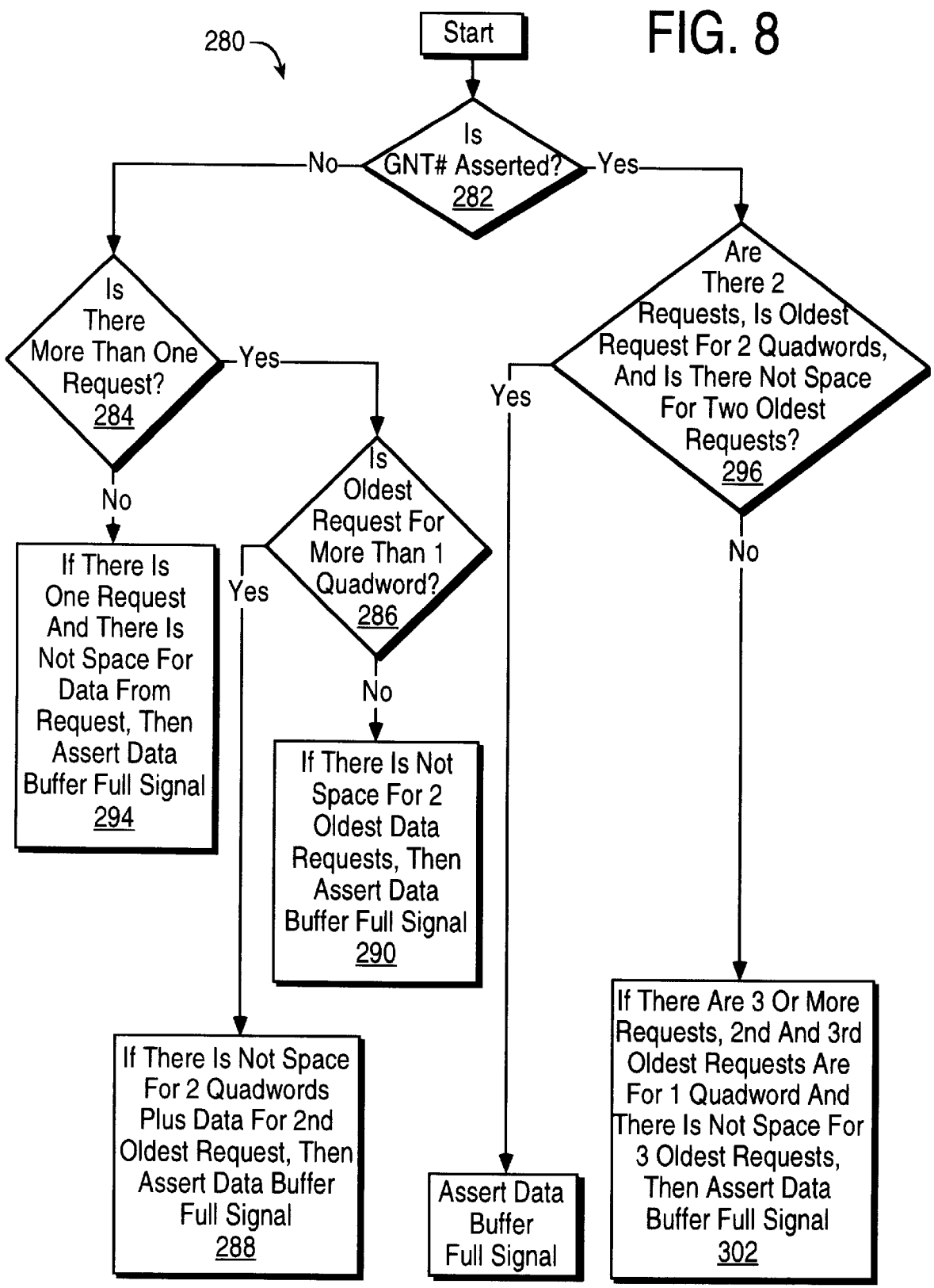
FIG. 8 is a flowchart illustrating a method for determining whether to assert the DBF# signal and stall the return of dispatched data packets.

FIGS. 8 is a flowchart illustrating a method 280 of analyzing whether to assert the data buffer full signal, i.e. DBF#, based on information contained in the GNT# signal, the SIZE and REQUEST signals of Table 1, and the NO_SPACE_X signals of Table 3. At block 282, the method bifurcates depending on whether the GNT# signal is asserted. The method assumes that two data requests may be dispatched by the external device 12, i.e. two dispatch cycles, between receiving the above-mentioned signals and determining whether to assert the DBF# signal. A person of ordinary skill in the art having the present disclosure could modify the present method for situations where the analysis uses a different number cycles to determine whether to assert the DBF# signal.

At block 284, if the GNT# signal is not asserted, it is determined whether more than one request is outstanding. At block 286, if more than one request is outstanding, it is determined whether the oldest outstanding request is for more than one quadword. At block 288, if the oldest outstanding request is for more than one quadword, at block 286 and there is not enough space for data from the second oldest outstanding request plus two quadwords in the data buffer 14, then DBF# signal is asserted. At block 290, if the oldest outstanding request is determined to be for one quadword at block 286 and there is not space for data from the two oldest outstanding data requests in the data buffer 14, then the DBF# signal is asserted. At block 294, if less than two requests are determined to be outstanding at block 284, one request is outstanding, and there is insufficient space for data from the request in the data buffer 14, then the DBF# signal is asserted. If the granted signal, i.e. the GNT# signal, is not asserted and the above cases do not apply, the DBF# signal is not asserted because there is enough space in the data buffer 14.

At block 296, if the GNT# signal is asserted, it is determined whether there are at least two outstanding requests, whether the oldest outstanding request is for 2 quadwords, and whether there is insufficient space for data from the two oldest outstanding requests in the data buffer 14. If these three conditions are true, then the DBF# signal is asserted. Otherwise, at block 302, if there are at least three outstanding requests, the second and third oldest outstanding requests are for one quadword each, and there is not enough space in the data buffer 14 for data from the three oldest requests, then the DBF# signal is asserted. Otherwise, if GNT# is asserted, the DBF# signal is not asserted, because there is enough space in the data buffer 14.

Figure 9:
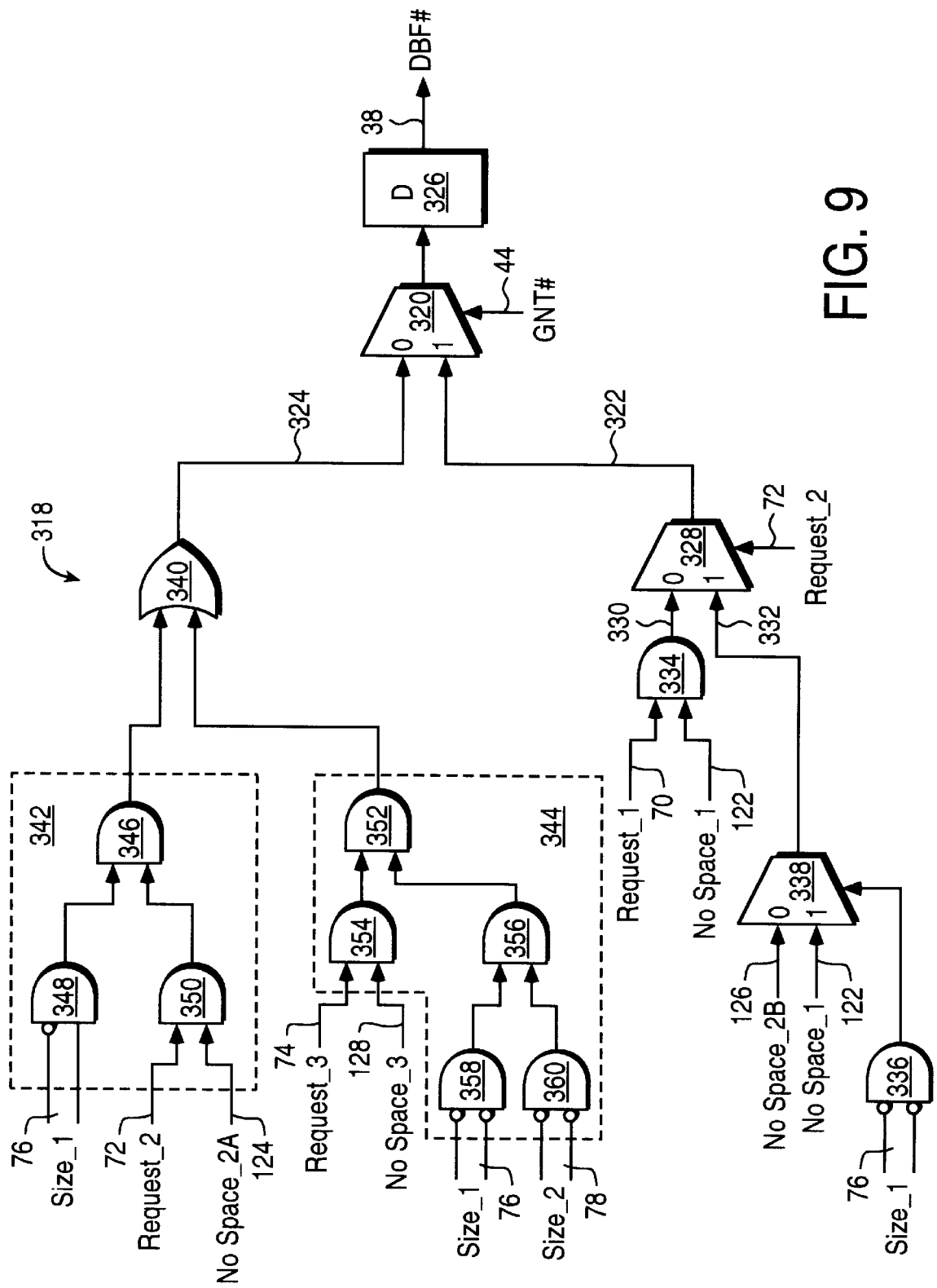
FIG. 9 is a circuit diagram for one embodiment of the DBF logic unit employed in FIG. 3.

FIG. 9 illustrates an embodiment for the DBF logic unit 96 of FIG. 3. The DBF logic unit 96 implements the logic of the flowchart of FIG. 8. Table 4 illustrates conditions for the logical decisions that are used in FIG. 8.

TABLE 4

| DBF# = 0 LOGIC CONDITIONS OF FIG. 8 | |
| --- | --- |
| IF CASE A. | GNT# = 1 AND |
| | 1. REQUEST_2 = 0 AND REQUEST_1 = 1 AND NO_SPACE_1 = 1; |
| | OR |
| | 2. REQUEST_2 = 1 AND SIZE_1 ≠ 00 AND NO_SPACE_2B = 1; |
| | OR |

TABLE 4-continued

DBF# = 0 LOGIC CONDITIONS OF FIG. 8

|  | 3. REQUEST_2 = 1 AND SIZE_1 = 00 AND NO_SPACE_1 = 1; |
|---|---|
| OR IF CASE B. | GNT# = 0 AND |
|  | 1. REQUEST_2 = 1 AND SIZE_1 = 01 AND NO_SPACE_2A = 1; |
|  | OR |
|  | 2. REQUEST_3 = 1 AND SIZE_1 = SIZE_2 = 00 AND NO_SPACE_3 = 1. |
| THEN DBF# = 0. | |

Referring to FIG. 9, a logic circuit 318 employs a multiplexer 320 to implement the condition on GNT# distinguishing cases A and B of Table 4. In case A, GNT#=1, and input line 322 of the multiplexer 320 is active. In case B, the GNT#=0, and input line 324 of the multiplexer 320 is active. The output of the multiplexer 320 connects to a D flip-flop 326 whose inverting output provides the DBF# signal under appropriate conditions.

For case A of Table 4, a multiplexer 328 connects line 330 for case A1, i.e. for REQUEST_2=0, and connects line 332 for case A2 and A3, i.e. for REQUEST_2=1 to the line 322. A gate 334 insures that the input signals REQUEST_1 and NO_SPACE_1 appropriate to case Al of Table 4 to produce the DBF# signal. A second gate 336 selects inputs of a 2×1 multiplexer 338 corresponding to case A2 and A3 of Table 4, when SIZE_≠100 and SIZE_1=00, respectively. Thus, the input line 332 and attached circuits are a hardware implementation of case A of Table 4.

Referring to FIG. 9 an OR gate 340 couples first and second circuits 342, 344 for producing the DBF# signal under the conditions of case B1 and case B2 of Table 4. The first circuit 342 uses three gates 346, 348, 350 to implement the three conditions of case B1 and produce the DBF#=0 signal for appropriate REQUEST_2, SIZE_1, and NO_SPACE_2A input signals on the lines 72, 76, 124. Finally, five additional gates 352, 354, 356, 358, 360 implement the four conditions of case B2 and produce the DBF#=0 signal for appropriate values of the REQUEST_3, SIZE_1, SIZE_2 and NO_SPACE_3 signals on the lines 74, 76, 78, 128. Thus, the first and second circuits 342, 344 produce the DBF# signal for the conditions of cases B1 and B2 of Table 4.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of controlling data packet dispatch, comprising:

storing information on a plurality of requested data packets within a request buffer;

determining, for each of said plurality of requested data packets, whether a data request granted signal has been asserted;

generating a first size signal, wherein the first size signal corresponds to a size of a first requested data packet for which a data request granted signal has not been asserted;

generating an available space signal, wherein the available space signal corresponds to space available in a data buffer configured to receive requested data packets;

comparing the first size signal to the available space signal; and preventing a dispatch of the first requested data packet in response to a determination that the first size signal is greater than the available space signal.

2. The method as set forth in claim 1, wherein preventing the dispatch of the first requested data packet and the second requested data packet comprises asserting a data buffer full signal and stalling an external device while the data buffer full signal is asserted.

3. The method as set forth in claim 2, wherein asserting the data buffer full signal prevents a dispatch of all requested data packets for which a data request granted signal has not been asserted.

4. The method as set forth in claim 1, further comprising:

generating a second size signal, wherein the second size signal corresponds to a size of a second requested data packet for which a data request granted signal has not been asserted;

comparing the first size signal and the second size signal to the available space signal; and preventing a dispatch of the second requested data packet in response to a determination that a sum of the first size signal and the second size signal is greater than the available space signal.

5. The method as set forth in claim 1, further comprising:

generating a second size signal, wherein the second size signal corresponds to a size of a second requested data packet for which a data request granted signal has been asserted, wherein generating an available space signal comprises generating an available space signal utilizing the second size signal.

6. The method as set forth in claim 5, wherein generating an available space signal utilizing the second size signal comprises:

generating an available space signal wherein the available space signal corresponds to space available in a data buffer diminished by an amount equal to the size of the second requested data packet.

7. The method as set forth in claim 4, further comprising comparing the second size signal to the available space signal, and wherein comparing the first size signal and the second size signal to the available space signal comprises comparing the first size signal and the second size signal to the available space signal in response to a determination that the second size signal is less than the available space signal.

8. The method as set forth in claim 2, wherein comparing the first size signal and the second size signal to the available space signal and asserting a data buffer full signal are completed within a first time period and a dispatch of more than two requested data packets may be completed by the external device within a second time period, and further wherein the first time period is less than the second time period.

9. The method as set forth in claim 1, further comprising storing a plurality of received data packets for which a data request granted signal has been asserted within the data buffer; and transmitting the received data packets from the data buffer to a data packet requester.

10. The method as set forth in claim 9, wherein transmitting the received data packets comprises transmitting the received data packets from the data buffer in an order corresponding to an order in which the information on the plurality of requested data packets is stored within the request buffer.

11. An apparatus for receiving requested data packets from an external device, comprising:

a request buffer configured to store information on a plurality of requested data packets;

a data buffer configured to store requested data packets; and a control logic unit configured to determine for each of the plurality of requested data packets, whether a data request granted signal has been asserted, and to prevent a dispatch of a first requested data packet for which a data request granted signal has not been asserted in response to a determination that a size of the first requested data packet is greater than a space available within the data buffer.

12. The apparatus as set forth in claim 11, wherein the control logic unit is further configured to transmit a data buffer full signal to the external device and wherein the external device is configured to receive a data buffer full signal and to cease dispatching a particular data packet at least one dispatch cycle ahead of a dispatch of the particular data packet.

13. The apparatus as set forth in claim 11, wherein the external device is configured to transmit a data request granted signal for each requested data packet that will dispatch within a predetermined period of time.

14. The apparatus as set forth in claim 11, wherein the information stored within the request buffer includes data packet sizes and a number of outstanding requests.

15. The apparatus as set forth in claim 14, wherein the request buffer is a first-in-first-out buffer.

16. The apparatus as set forth in claim 11, where in the data buffer is a first-in-first-out buffer.

17. The apparatus as set forth in claim 16, further comprising:

an output pointer associated with the data buffer; and wherein the control logic unit is configured to use the output pointer to determine the space available within the data buffer.

18. The apparatus as set forth in claim 17, further comprising:

an input pointer associated with the data buffer;

a look ahead pointer device configured to receive a data request granted signal from the external device and a size signal from the request buffer and to generate a future position of the input pointer; and a comparator configured to determine a space available within the data buffer by comparing the future position of the input pointer and the output pointer.

19. The apparatus as set forth in claim 11, wherein the data buffer is adapted to store data packets having at least two preselected sizes.

20. The apparatus as set forth in claim 11, wherein the request buffer is configured to store information on a greater number of requested data packets than the data buffer is configured to store.

21. A data flow controller, comprising:

a data buffer configured to store requested data packets;

a request buffer configured to store information on a plurality of requested data packets; and a control logic unit configured to determine for each of the plurality of requested data packets, whether a data request granted signal has been asserted and to prevent a dispatch of a first requested data packet for which a data request granted signal has not been asserted in response to a determination that a size of the first requested data packet is treater than a space available within the data buffer.

22. The data flow controller as set forth in claim 21, further comprising an external device configured to assert a data request granted signal and to dispatch a requested data packet a predetermined period of time after asserting a data request granted signal.

23. The data flow controller as set forth in claim 21, wherein the request buffer is configured to store information on a greater number of requested data packets than the data buffer is configured to store.

24. The data flow controller as set forth in claim 22, wherein the control logic unit is further configured to transmit a data buffer full signal to the external device and wherein the external device is further configured to receive a data buffer full signal and to cease dispatching a particular data packet at least one dispatch cycle ahead of a dispatch of the particular data packet.

* * * * *

UNITED STATES PATENT AND TRADEMARK OFFICE
CERTIFICATE OF CORRECTION

PATENT NO. : 6,026,451
DATED : February 15, 2000
INVENTOR(S) : Sreenivas

It is certified that error appears in the above-identified patent and that said Letters Patent is hereby corrected as shown below:

In column 3, at line 27, delete "USA" and insert --ISA--.

In column 8, at line 13, after "requested" delete --,--.

In column 8, at line 57, delete "a" and insert --an--.

In column 9, at line 57, after "quadwords" insert --of--.

In column 14, at line 28, delete "treater" and insert --greater--.

Signed and Sealed this

Fifteenth Day of May, 2001

Attest:

NICHOLAS P. GODICI

Attesting Officer     Acting Director of the United States Patent and Trademark Office